United States Patent [19]

Hughes

[11] 4,163,325

[45] Aug. 7, 1979

[54] VERTICALITY SENSORS

[75] Inventor: David Hughes, Blackwater, England

[73] Assignee: Sperry Rand Limited, Bracknell, England

[21] Appl. No.: 907,525

[22] Filed: May 19, 1978

[30] Foreign Application Priority Data

May 21, 1977 [GB] United Kingdom .............. 21573/77

[51] Int. Cl.² .............................................. G01C 9/08
[52] U.S. Cl. ...................................... 33/346; 33/366; 33/396
[58] Field of Search .......................... 33/346, 396, 366

[56] References Cited

U.S. PATENT DOCUMENTS

| 4,027,399 | 6/1977 | Armstrong et al. ............... 33/366 |
| 4,099,334 | 7/1978 | Kuzin et al. ...................... 33/366 X |

Primary Examiner—Charles E. Phillips
Attorney, Agent, or Firm—Howard P. Terry

[57] ABSTRACT

A verticality sensor comprises a casing within which is mounted a rotary pick-off device having a body attached to the casing and mounted on a shaft for relative rotational movement with respect thereto, such movement producing an output signal from the pick-off representative of the angular rotation of the casing with respect to the vertical, pendulum means mounted on the pick-off shaft for relative rotational movement with respect thereto, and inertia means fixed to the pick-off shaft and coupled to the pendulum means through a fluid, with which the casing is filled, and through spring means. The arrangement is such that when the pendulum is subjected to lateral accelerations and undergoes rotational movement relative to the pick-off, the spring means is torsioned and thereby attempts to transmit that rotational movement to the inertia member which the latter resists, whereby the effect of lateral acceleration is reduced.

8 Claims, 1 Drawing Figure

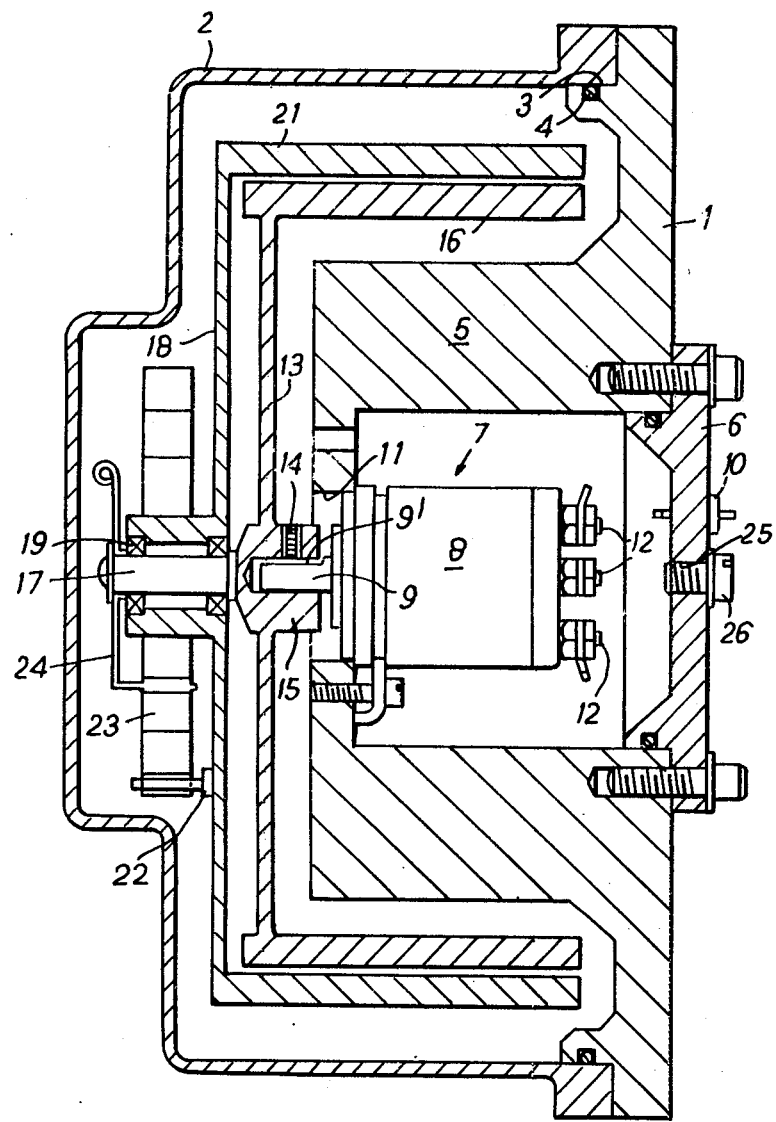

VERTICALITY SENSORS

This invention relates to verticality sensors.

There is known a verticality sensor comprising a rotary pick-off which produces an output signal representative of any relative angular displacement between the pick-off shaft and body, the pick-off shaft having fixed thereto a pendulum which serves to maintain the shaft stationary when the pick-off body is rotated. In order to damp the pendulum, an inertia member is rotationally mounted co-axially with the pick-off shaft and coupled to the pendulum through a viscous fluid. This known sensor operates satisfactorily unless it is subjected to lateral accelerations whereupon the pendulum oscillates and hence produces a false output from the pick-off. The sensor is a relatively simple, inexpensive device which makes it attractive for use in a number of different applications but in many of them the problem of lateral acceleration is experienced and the main object of the present invention is to reduce or eliminate the problem. By lateral accelerations is meant relatively short-lived, but high accelerations acting at an angle to the pick-off shaft.

According to the present invention a verticality sensor comprises a casing within which is mounted a rotary pick-off device having a body attached to the casing and mounted on a shaft for relative rotational movement with respect thereto, such movement producing an output signal from the pick-off representative of the angular rotation of the casing with respect to the vertical, pendulum means mounted on the pick-off shaft for relative rotational movement with respect thereto, and inertia means fixed to the pick-off shaft and coupled to the pendulum means through a fluid, with which the casing is filled, and through spring means, the arrangement being such that when the pendulum is subjected to lateral accelerations and undergoes rotational movement relative to the pick-off, the spring means is torsioned and thereby attempts to transmit that rotational movement to the inertia member which the latter resists, whereby the effect of lateral acceleration is reduced.

In a preferred embodiment the spring means are in the form of a torsion spring having one end attached to the pendulum means and the other end to the pick-off shaft to which the inertia means are fixed. The pendulum means and inertia means may each be in the form of a wheel having a hub by which it is mounted on the pick-off shaft and an annular, axially-extending, skirt, the two skirts being closely spaced to effect the coupling of the pendulum means and inertia means via the viscous fluid.

Preferably the fluid is chosen such that the pendulum means and inertia means are neutrally buoyant therein which reduces to a minimum the friction in the bearing by which the pendulum means are mounted on the pick-off shaft and the bearings in which the pick-off shaft itself is mounted. A particularly good combination to achieve neutral buoyancy is to fill the casing with a liquid known as Fluorolube and having a density of 1.9 gm/cm$^3$, and to make the pendulum means and inertia means from magnesium alloy which has a density of 1.83 gm/cm$^3$. However, it is possible to use silicone fluids with synthetic plastics material of comparable specific gravities or to employ buoyancy tanks on the pendulum means and inertia means.

A verticality sensor constructed in accordance with the present invention will now be described in greater detail, by way of example, with reference to the accompanying drawing which shows a cross-section of the sensor.

The sensor comprises a casing composed of a circular base 1 (as seen in plan view) and a cover 2 which seats in a rebate 3 in the base, a sealing ring 4 being provided to seal the junction. In the illustrated embodiment, the base 1 and cover 2 are made from an aluminum alloy but any other material may be used. The base 1 has a central boss 5 extending towards the cover 2, the outer end of the boss being sealed with a plate 6. A rotary pick-off 7 is mounted within the boss 5, the body 8 of the pick-off being bolted to the inner end of the boss and the pick-off shaft 9 extending through an aperture 11 into the interior of the casing. The pick-off shaft 9 is mounted on bearings (not shown) to permit relative rotational movement between the shaft and the pick-off body 8 which houses coils, an electrical output signal being produced on relative rotational movement taking place with the signal representing the magnitude of that angular movement. Electrical terminals 12 are provided on the pick-off through which the pick-off coils are energised and from which output signals are taken, the necessary electrical leads (not shown) being taken through sealed terminals 10 in the plate 6.

An inertia wheel 13 is fixed to the pick-off shaft 9 by a grub screw 14 provided in a hub 15 of the inertia wheel and cooperating with a flat 9' on the shaft. The inertia wheel 13 has an axially-extending annular skirt 16 which surrounds the boss 5 of the base 1 and the hub 15 of the inertia wheel has an axial extension 17 which is, in effect, an extension of the pick-off shaft 9. A pendulum wheel 18 is mounted on the extension 17 via two bearings 19, the pendulum also having an axially-extending annular skirt 21 which surrounds, and is closely spaced from, the skirt 16 of the inertia wheel 13. The pendulum 18 is given its pendulosity by a combined bob weight and peg 22 to which is attached one end of a constant rate torsion spring 23, the other end of which is attached to the extension 17 via a retaining clip 24 which extends radially beyond the extension such that the clip itself has no pendulosity.

Once assembly of the sensor has been completed, the casing is filled through a fill hole 25 in the plate 6, with allowance for expansion, with a liquid known as Fluorolube, the hole 25 then being sealed by a screw 26. The inertia wheel 13 and the pendulum wheel 18 are made from magnesium alloy which has a density (1.83 gm/cm$^3$) closely matching that of Fluorolube (1.9 gm/cm$^3$), whereby the two wheels substantially have neutral buoyancy which reduces to a minimum the friction in the bearing 19 and the pick-off shaft bearings (not shown) and this improves the performance of the sensor.

In use, the sensor is mounted via the base 1 on the member the verticality of which in a selected plane is to be sensed, with the base 1 vertical as shown in the accompanying drawing. When the member to be sensed is vertical, the output from the pick-off 7 is zero and the spring 23 is not under torsion. When the member moves out of the vertical in the selected plane, it carries the base 1 and the pick-off body 8 with it, the latter rotating relative to the pick-off shaft 9 which is retained stationary relative to space fixed axes by the pendulum bob 22 acting through the torsion spring 23, assisted by the physical inertias of the inertial wheel 13 and pendulum

18. The rotation of the pick-off body 8 produces an output signal from the pick-off 7 representative of the magnitude and direction of the angular rotation, which signal can be used to energise a display of the angle in question, operate an alarm or put to any other desired use.

If the sensor is subjected to short-lived but high lateral accelerations acting generally at an angle to the pick-off shaft 9, the pendulum 18 tends to swing whilst the pick-off body 8 remains stationary. A torsion is produced in the torsion spring 23 which tends to rotate the pick-off shaft 9 but this motion is resisted by the inertia wheel 13. Thus the false output signal from the pick-off 7 caused by the rotation of the shaft 9 relative to the body 8 is reduced to a minimum, especially for very short-lived lateral accelerations. The viscous couple generated by the Fluorolube in the gap between the skirts 16 and 21 is selected to give the required damping of the motions involved.

It will be appreciated that the viscous coupling effected by the fluorolube is only required between the inertia wheel 13 and the pendulum 18, whereby the gap between the skirts 16 and 21 is made as small as possible (consistent with the skirts never being able to contact one another directly), with the gaps between the skirts and the base 1 and cover 2 being as large as possible.

The sensor shown in the accompanying drawing is designed for use on a ship but sensors in accordance with the invention have many other applications such as, for example, on land vehicles and on riser pipes for oil rigs, and may also be used in pipe laying and high frequency dynamic levelling. In those environments where lateral accelerations are encountered at frequencies lower than the natural frequency of the pendulum, these still tend to rotate the pendulum to a reduced extent but accelerations at or above the natural frequency are compensated by the present invention. The natural frequency of the pendulum is, in general, thus designed to be less than that of the member to which the sensor is fixed, i.e., the ship in the case of the described embodiment. The present invention provides a fourth order sensor which is a significant advance on known sensors which are usually second order devices and at best, third order devices.

I claim:

1. A verticality sensor comprising a casing within which is mounted a rotary pick-off device, said pick-off device having a body attached to the casing and having a rotatable shaft for relative rotational movement with respect to the casing and body, such movement producing an output signal from the pick-off representative of the angular rotation of the casing with respect to the vertical, pendulum means mounted on the pick-off shaft for relative rotational movement with respect thereto, and inertia means fixed to the pick-off shaft and coupled to the pendulum means through a fluid, with which the casing is filled, and through spring means, the arrangement being such that when the pendulum is subjected to lateral accelerations and undergoes rotational movement relative to the pick-off, the spring means is torsioned and thereby attempts to transmit that rotational movement to the inertia member which the latter resists, whereby the effect of lateral acceleration is reduced.

2. A sensor according to claim 1, wherein the spring means are in the form of a torsion spring having one end attached to the pendulum means and the other end to the pick-off shaft to which the inertia means are fixed.

3. A sensor according to claim 2 wherein the pendulum means and inertia means may each be in the form of a wheel having a hub by which it is mounted on the pick-off shaft and an annular, axially-extending, skirt, the two skirts being closely spaced to effect the coupling of the pendulum means and inertia means via the viscous fluid.

4. A sensor according to claim 1, wherein the pendulum means and inertia means may each be in the form of a wheel having a hub by which it is mounted on the pick-off shaft and an annular, axially-extending, skirt, the two skirts being closely spaced to effect the coupling of the pendulum means and inertia means via the viscous fluid.

5. A sensor according to claim 1, 2, 3 or 4, wherein the fluid is such that the pendulum means and inertia means are neutrally buoyant therein, thereby reducing to a minimum the friction in bearing means by which the pendulum means are mounted on the pick-off shaft and bearing means in which the pick-off shaft itself is mounted.

6. A sensor according to claim 5, wherein the fluid is a liquid known as Fluorolube and having a density of 1.9 gm/cm$^3$, and wherein the pendulum means and inertia means are composed of magnesium alloy having a density of 1.83 gm/cm$^3$.

7. A sensor according to claim 5, wherein the fluid is a silicone fluid and the pendulum means and inertia means are composed of a synthetic plastics material of a specific gravity comparable with that of the silicone fluid.

8. A sensor according to any of claims 1, 2, 3 or 4 wherein buoyancy tanks are fitted on the pendulum and inertia means to achieve neutral buoyancy thereof in the fluid.

* * * * *